United States Patent

Laub

[15] 3,706,843

[45] Dec. 19, 1972

[54] NARROW-BANDWIDTH TELEVISION SYSTEM

[72] Inventor: Leonard J. Laub, Chicago, Ill.

[73] Assignee: Zenith Radio Corporation, Chicago, Ill.

[22] Filed: Oct. 29, 1969

[21] Appl. No.: 872,047

[52] U.S. Cl. ................................178/6.8, 178/DIG 3
[51] Int. Cl. ................................................H04n 7/12
[58] Field of Search...........................178/DIG. 3, 6.8

[56] References Cited

UNITED STATES PATENTS

| | | | |
|---|---|---|---|
| 3,564,133 | 2/1971 | Hobrough | 178/6.8 |
| 2,850,574 | 9/1958 | Krettmer | 178/6 BW |
| 2,895,005 | 7/1959 | Koca | 178/6.8 |
| 2,921,211 | 1/1960 | Toulon | 178/7.5 |
| 2,974,195 | 3/1961 | Julesz | 178/6 BW |

OTHER PUBLICATIONS

Fink–Television Engineering Handbook–McGraw-Hill 1957, pp. 9–14, 9–15

*Primary Examiner*—Robert L. Richardson
*Assistant Examiner*—Joseph A. Orsino, Jr.
*Attorney*—John J. Pederson and R. A. Blackstone

[57] ABSTRACT

A television system for transmitting a video signal on a narrow-bandwidth bases. A driven sampling-rate generator is responsive to the video signal for developing a control signal having a frequency equal to a non-integral factor times the line rate of the video signal. A sampling circuit is responsive to the control signal for producing a narrow-bandwidth transmission signal. A second sampling circuit located at the receiver derives a representative video signal from the narrow-bandwidth signal and synchronizes the representative signal with the control signal.

1 Claim, 8 Drawing Figures

Inventor
Leonard J. Laub

By R. A. Blackstone

Agent

Inventor
Leonard J. Laub

By R. A. Blackstone
Agent

Inventor
Leonard J. Laub
By R. T. Blackston
Agent

NARROW-BANDWIDTH TELEVISION SYSTEM

BACKGROUND OF THE INVENTION

The increasing use of the radio frequency spectrum, the increase in the amount of data transmitted, and the introduction of limited-bandwidth space-to-earth communications systems have shown the need for further substantial reductions in the time-bandwidth product required for data transmission. Consequently, considerable effort has been expended to produce systems which transmit wide-bandwidth signals through a relatively narrow-bandwidth channel and yet still convey enough information to enable the system's receiver to produce a signal satisfactorily representative of the original wide-band signal. Readily apparent advantages provided by such a system further include reducing the power required for signal transmission and enabling the transmission of a plurality of programs over a given, relatively wide-bandwidth channel; that is, the wide-bandwidth channel may be divided into several narrow-bandwidth channels each carrying a separate program.

Applications of narrow-bandwidth transmission systems include the transmission of fixed images from one point to another such as a facsimile and radio-photo systems employed by news-gathering services to transmit news pictures rapidly from one city to another. The image-scanning and reproducing portions of such systems have been developed to the point that resolution of 200 lines per inch is well within the state of the art. Resolution of this order permits the transmission of high-quality photographs, maps, etc., with no noticeable loss in detail. However, such systems generally require either a very wide video bandwidth or a relatively long time to transmit the images. It has been shown that the time-bandwidth product for such systems is directly proportional to the total area of the image multiplied by the maximum number of resolvable picture elements to be transmitted for any unit area of the image.

Another application of a narrow-bandwidth transmission system is a closed circuit television system of the type provided as a video signal accompaniment to a telephone conversation. Because of the high cost involved, a wide-bandwidth system is not economically feasible in this application because the individual user must bear a major portion of the cost of transmission, as contrasted with commercial television broadcasts which are supported by the large number of viewers reached thereby (albeit indirectly, by purchasing a sponsor's product).

Yet another application of a narrow-bandwidth transmission system for transmitting high-detail pictorial data through a channel of limited bandwidth involves the recording of a video television signal on magnetic tape. Here, the limited bandwidth channel is the magnetic tape itself. The state of the art of magnetic recording of wide-bandwidth video television signals is such that relatively complex techniques and expensive circuitry are required to obtain sufficient bandwidth from magnetic tape to enable satisfactory recording and reproduction of the high-frequency signals. A simple and economical method for obtaining a satisfactory narrow-bandwidth representation of the relatively wide-bandwidth video signal, which representation could be easily recorded on existing magnetic tape by relatively inexpensive magnetic recorders for subsequent playback at a later time, would render video recording quite feasible for the consumer-product market.

While such a system would find wide-spread application in any area concerned with narrow-bandwidth signal transmission, of immediate importance is its application in television. In general, the widespread use of television today for various applications in addition to entertainment, including surveillance and educational applications, makes it particularly interesting to investigate and develop narrow-bandwidth transmission systems adaptable to efficiently and economically transmit video television signals. In the field of education, multiple-program transmissions over a single channel to various members of a class, for example, may be achieved with such a system. Moreover, video recording in the home could become economically feasible for the average consumer if a system could be developed incorporating circuitry having a relative simplicity in the nature of that used in home-entertainment audio recording equipment.

The present television system adopted in the United States provides a picture frame consisting of 525 horizontal lines scanned at a frame rate of 30 times per second, resulting in a video signal bandwidth of 4.25 megahertz. Rather than transmit 30 images per second, which would produce objectionable flicker, twice as many images per second are scanned with half the number of lines per image, thus retaining the video signal bandwidth of 4.25 megahertz. This system, known as "vertical interlace," calls for the odd numbered lines to be scanned in one field in one-sixtieth of a second and the even numbered lines to be scanned in the next field in one-sixtieth of a second so that a complete picture frame consists of two fields, totaling 525 lines, and is scanned in one-thirtieth of a second.

The 4.25 megahertz video signal bandwidth limits the number of resolvable picture elements (white dots or black dots, i.e., the absence of white dots), for a monochrome receiver, presented along each of the horizontal scanning lines to about 450. Bearing in mind that each cycle of the video frequency can represent two picture elements, the 4.25 megahertz bandwidth is determined by the product of the number of horizontal lines scanned per field (262.5), the number of fields scanned per second (60), and one-half the number of picture elements per horizontal scanned line (450), divided by the per unit active horizontal scanning time (0.83). Quite obviously, bandwidth reduction may only be achieved by modifying one or more of these bandwidth-determining factors.

For example, the video signal may be fed through a low-pass filter cutting off at 139 kilohertz; this reduces the number of picture elements resolved in the 52 microsecond line time from 450 to 14.5. Thus, the bandwidth has been reduced and this narrow-bandwidth signal can now be transmitted through a relatively narrow-bandwidth channel. However, sine the line rate remains a constant 15.75 kilohertz (which is well below the cutoff frequency of the filter), the television receiver to which this 139 kilohertz signal is applied displays a picture with 525 lines, each line having approximately 14 ½ picture elements resolved across it. Consequently, despite the fact that each frame contains approximately 7,600 picture elements, enough for an eye-pleasing 76 × 100 element picture, the display is very uninformative because it is quite astigmatic and badly resolved horizontally. In other words, the picture appears very blurry as if it had been badly smeared. Obviously, this low-pass filter approach leaves much to be desired.

Prior art approaches to the problem are widely varied and produce results of various degrees of satisfaction, with those producing the best results usually entailing the highest cost. One approach takes advantage of the degree of correlation between successive signals to attempt to predict the future of the signal in terms of its past. This involves rather sophisticated circuitry and often produces unsatisfactory results. Another approach involves signal quantization techniques of the type used in pulse code modulation to quantize the signal amplitude into a number of predetermined amplitude levels. Unless a relatively large number of quantizing levels are employed, however, any gradual change in brightness across the picture appears as a series of discrete steps resulting in annoying brightness contours which are visible in the picture. Clearly, an increase in the number of quantizing levels employed results in a proportional increase in the volume of information and entails a substantial increase in the complexity and expense of the associated equipment necessary to encode and decode the quantized signal.

Another approach is to combine the pulse code modulation technique with the signal-prediction technique to reduce the number of digits required in the transmitted pulse code by reducing the number of quantizing levels used to encode each signal sample. An advantageous method of reducing the required number of quantizing levels without causing severe degradation of a video picture, for example, is to use a system in which only the signal changes (rather than the full signal itself) are encoded and transmitted. A well-known scheme utilizing this principle it termed "-differential encoding." In predictive differential encoding, prediction techniques are used to encode the difference between the signal then being sampled and a predicted value of the signal, rather than encoding the full value of the sampled signal. The predicted value is generally related to the signal of the preceding sample. Significant bandwidth savings are achieved because only the changes in the signal are encoded and such signal changes on the average have a smaller amplitude range than that of the signal itself. It is readily apparent that a smaller number of quantizing levels are needed to encode the difference signal; hence, a smaller number of code digits are needed for the transmission of those levels. Such a differential encoding scheme is disclosed, for instance, in U.S. Pat. No. 2,905,756 - Graham.

There are several limitations, however, on the above approach which make it somewhat impractical for consumer products use. First, the circuitry required is quite elaborate and therefore rather expensive. Second, in a video signal application, an important part of the picture information is the edge of an object appearing in the picture. Such an edge generally represents a comparatively sharp amplitude discontinuity in successive samples of the video signal. Differential encoding has less amplitude discrimination capabilities than the conventional full-scale pulse code encoding scheme; hence, an amplitude change in the video signal representing an edge may exceed the amplitude range of the differential code. As a result thereof, distorted brightness changes occur at sharp contrast edges in the reproduced picture and successive lines do not register. To overcome this limitation, additional circuitry is required which entails even more expense.

Still another type of prior art approach to this problem is the employment of sampling techniques to produce a narrow-bandwidth signal representative of the television video signal. With this method, the video signal is gated by a train of short pulses to produce a train of pulses, with each pulse having an amplitude which is the instantaneous amplitude of the video signal at the time of the gating pulse. By the sampling theorem, this train of pulses is capable of encoding a sine wave whose frequency is up to one-half the repetition rate of the pulses.

Such a system, however, presents significant problems. One problem results from the face that one picture frame is achieved by interlacing two raster scans. If a horizontal line of sampling pulses is used to sweep the raster, a horizontal resolution problem similar to that described above is encountered. On the other hand, if a vertical line of sampling pulses is used to sweep the raster, a very cumbersome system results because the line of sampling pulses must be held in the same place twice in order to get a full picture. Furthermore, if a combination of horizontal and vertical sampling lines were used, an even more complex system would be required because each sampling occurrence must be separated by a time interval during which the remaining horizontal lines in one-half of the interlaced raster are sampled through one vertical sweep.

It is therefore the primary object of the invention to provide a new and improved narrow-bandwidth signal transmission system having a relatively simple and economical construction.

It is a further object of the invention to provide such a system which is conveniently adaptable to conventional television receivers.

It is a more specific object of the invention to provide such a system which is especially suitable for economical recording and reproduction of video television signals.

SUMMARY OF THE INVENTION

In accordance with the invention, a television system for narrow-bandwidth transmission from a source to a receiver of a video signal having a plurality of picture lines per picture frame and the lines occurring at a pre-established line rate, comprises means, including a driven sampling-rate generator responsive to the video signal, for developing a control signal having a frequency equal to a non-integral factor times the line rate. Impulse modulation means, including a first sampling circuit, responsive to the control signal are provided for producing a narrow-bandwidth transmission signal embodying a portion of the video signal. Also provided are means for transmitting the narrow-bandwidth transmission signal to the receiver. Further provided are means, including a second sampling circuit having a sampling rate identical to the first sampling circuit, for deriving a reconstituted video signal from the transmission signal.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 2(*b*) is an illustration of the picture display of a television receiver for which the video signal bandwidth has also been reduced to approximately 139 kilohertz but modified in accordance with the principles of the invention;

DESCRIPTION OF THE PREFERRED EMBODIMENTS

Figure 1:
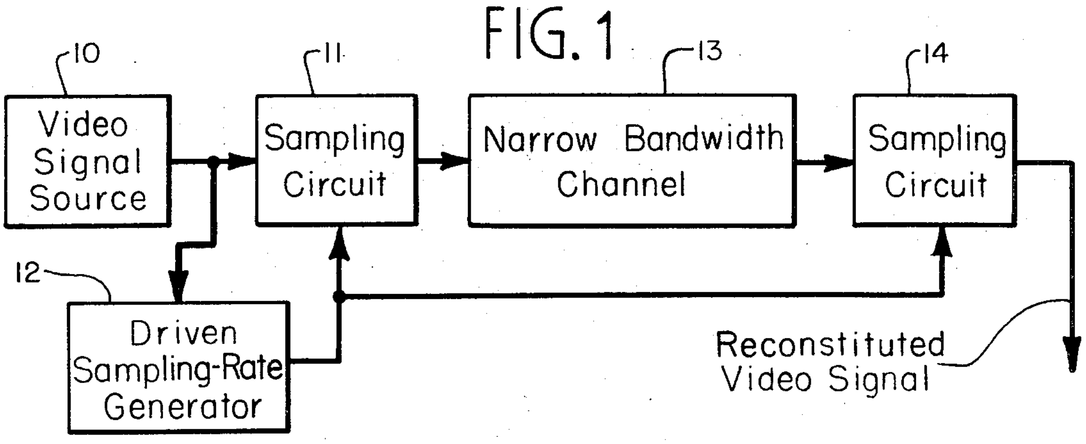
FIG. 1 is a block diagram of a preferred embodiment of a narrow-bandwidth transmission system constructed in accordance with the invention.

With reference to FIG. 1, a preferred embodiment of the invention incorporating a general principles thereof is shown in block diagram form. The invention is herein described primarily with reference to the transmission of video television signals, although it is quite obvious that any system employing similar wide-bandwidth signals may advantageously employ the principles of this invention. A video signal source 10 provides a conventional, relatively wide-bandwidth video signal having a given line rate (typically 15.75 kilohertz), for transmission in narrow-bandwidth form. The type of video signal source is not critical; it may be the video signal output of a television camera, the video detector signal output of a television receiver, or any such suitable source. A sampling circuit 11 is provided in accordance with the invention for sampling the video signal at a predetermined sampling rate equal to a non-integral factor times the line rate of the video signal to produce a series of sample pulses constituting a narrow-bandwidth transmission signal embodying a portion of the video signal, the portion depending on the sampling rate. This sampling operation is equivalent to impulse modulation (i.e., modulation using an impulse carrier) as hereinafter described in greater detail. Sampling circuit 11 may, for example, be a conventional sampling circuit as mentioned above which provides a train of short pulses to gate the video signal at a predetermined sampling rate and thereby provide a train of pulses with each pulse having an amplitude corresponding to the instantaneous amplitude of the video signal at the time of the associated gating pulse. By the sampling theorem, this train of pulses can encode a sine wave whose frequency is up to one-half the repetition rate of the pulses, i.e., the sampling rate. A driven sampling-rate generator 12 is responsive to the fundamental frequency of the video signal from source 10 (i.e., the video line rate) to develop a control signal having a frequency equal to a non-integral factor times the line rate. Sampling circuit 11 is responsive to the control signal to generate the sampling pulses at the predetermined sampling rate. Generator 12 may, for example, be a phase-locked frequency multiplier responsive to the line rate followed by a divider to produce the desired sampling rate.

The output of sampling circuit 11 is transmitted to the receiver (i.e., sampling circuit 14) by means of a narrow-bandwidth channel 13 which may include transmitting means having a limited bandwidth characteristic or transmitting means and a low-pass filter, for example, where transmission power requirements are of major concern. On the other hand, where the bandwidth of the transmission means itself is the limiting factor, such as magnetic recording tape for example, the low-pass filter is unnecessary and the entire system is designed around the bandwidth requirements of channel 13.

By passing the sampling pulses through narrow-bandwidth channel 13, be it a low-pass filter, magnetic recording tape, or whatever, the analog signal is reclaimed because the pulses require a relatively wide bandwidth for transmission and are therefore blocked by channel 13 with only the pulse-amplitude variations being passed. In the event a low-pass filter is included in channel 13, its cutoff frequency should be set at one-half the sampling pulse rate for maximum efficiency. Conversely, where the system is designed around the bandwidth limitation of channel 13, itself, maximum efficiency is achieved by selecting a sampling frequency approximately twice the value of the upper cutoff frequency of narrow-bandwidth channel 13. The narrow-bandwidth transmission signal thus developed is transmitted to the receiver where a representative video signal is derived therefrom. In the magnetic tape situation, where the transmitting medium itself is the narrow-bandwidth channel, the transmitter is the recording circuitry and the receiver is the reproduction or playback circuitry.

At the receiver, a second sampling circuit 14, similar to sampling circuit 11 and also responsive to the control signal of generator 12, gates the output of narrow-bandwidth channel 13 in order to derive the reconstituted video signal from the narrow-bandwidth transmission signal, as hereinafter explained in greater detail. Sampling circuit 14 also defines the location of the picture elements in the receiver; that is, sampling circuit 14 is responsive to the control signal in order to have a sampling rate identical to sampling circuit 11 for synchronizing the reconstituted video signal with the control signal so as to display the picture elements on the receiver display unit (not shown but may, for example, be a cathode-ray picture tube) in a predetermined manner. Of course, in a video recording application, sampling circuit 14 may be directly connected to generator 12. In broadcast applications where distance essentially precludes such a connection, however, advantage may be taken of the fact that the sampling rate is derived from the line rate so that by providing a second driven sampling-rate generator (not shown) identical to generator 12 and between channel 13 and sampling circuit 14, the separate transmission path for the control signal from generator 12 to sampling circuit 14 may be avoided.

As specified above in accordance with the invention, driven sampling-rate generator 12 is operated at a frequency which is a non-integral factor times the fundamental frequency of the wide-bandwidth signal. For a television video signal this fundamental frequency, commonly referred to as the line rate, is 15.75 kilohertz. Although a sampling frequency which is integrally related to the line frequency (e.g., 283.5 kilohertz, which is 18 times the line rate) produces a reconstituted video signal having approximately 14 picture elements in each horizontal scanning line to constitute a complete picture frame having a total of approximately 7,500 picture elements, each sampling pulse (and therefore each picture element) occurs at precisely the same place in its particular horizontal line as did its counterpart in the previous line. Consequently, such a reconstituted video signal creates a display having good vertical resolution but very poor horizontal resolution. Indeed the display is so badly distorted that it appears as 14 (in this example) vertical bars across the picture tube, similar to the above-described result obtained by merely low-pass filtering the video signal.

Similarly, a non-integrally related sampling frequency (e.g., 280 kilohertz, which is 17.75 times the line rate) produces a reconstituted video signal having approximately 14 picture elements in each horizontal scanning line to constitute a complete picture frame having a total of approximately 7,500 picture elements. Unlike the integrally related sampling frequency situation, however, the non-integrally related sampling frequency results in each picture element occurring at a different place in its particular horizontal line than did its counterpart in the previous line. Therefore, instead of a given vertical line containing 525 picture elements as with the integrally related sample rate, it contains only 131 picture elements. Although each horizontal scanning line actually contains only approximately 14 picture elements in either situation, to a person viewing a television receiver displaying such a reconstituted signal each horizontal line appears to contain four times as many or approximately 57 picture elements. Consequently, by employing the principles of the invention as hereinabove described, the reconstituted video signal display derived from the narrow-bandwidth transmission signal is greatly enhanced by decreasing vertical resolution and effectively increasing horizontal resolution in order to achieve a well-proportioned, eye-pleasing balance between the two and maximize the amount of information thus conveyed. A further understanding of this result may be had by reference to the immediately following discussion in connection with FIGS. 2(*a*) and 2(*b*).

Figure 2A:
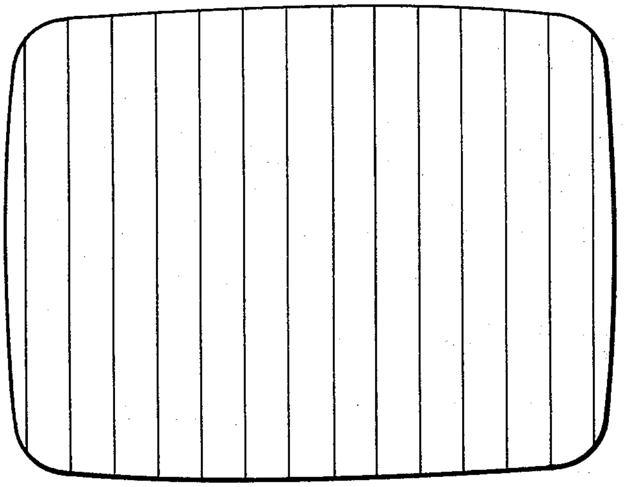
FIG. 2(*a*) is an illustration of the video display of a conventional television receiver for which the video signal bandwidth has been reduced from 4.5 megahertz to approximately 139 kilohertz by means of a low-pass filter.
Figure 2B:
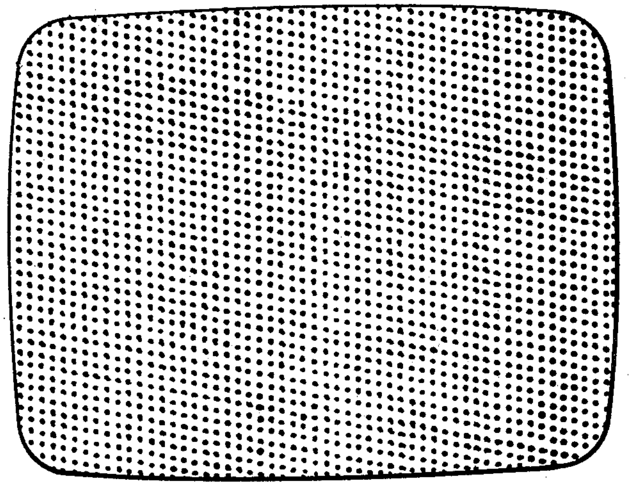

FIG. 2(*a*) illustrates the video display of a television receiver employing the narrow-bandwidth system shown in FIG. 1 wherein the sampling rate is an integral multiple of the video signal line rate. Since the samples fall at the same place on each horizontal line, the corresponding picture elements form vertical bars as shown (approximately 14 bars because of a sampling frequency equal to 18 times the line rate was selected for this example). By changing the sampling rate slightly, in accordance with the invention, so that it is a non-integral factor times the line rate (e.g., 17.75 times the line rate), the samples spread out as shown in FIG.2(*b*) and provide a display which is much better resolved horizontally yet maintains satisfactory vertical resolution. Although the same amount of video information (7,500 picture elements) is utilized, the display of FIG. 2(*b*) is certainly much more eye-pleasing and informative than that of FIG. 2(*a*). In other words, the invention achieves an effective trade-off between horizontal resolution and vertical resolution to substantially equalize them and thereby increase the system's efficiency in order to obtain the maximum amount of picture clarity from a signal having a given bandwidth, i.e., a fixed maximum number of resolvable picture elements.

For transmission of a stationary image, such as a slide projection, a photograph, or a printed page, the resolution of the above-described system may be enhanced by shifting the non-integral sampling rate a very slight amount (e.g., 100 hertz) so that the dot pattern runs across the screen; that is, the picture elements illustrated in FIG. 2(*b*) occur at slightly different horizontal locations on the screen for successive frames. The cumulative result is a picture which gains resolution as the integration time is increased until all the elements of the transmitted image have been shown. The minimum integration time required to show the entire picture is determined by the ratio of the highest frequency of the wide-bandwidth signal to the cutoff frequency of the narrow-bandwidth channel, multiplied by the time required to display one picture frame. For a video television signal having an upper frequency limit of 4.5 megahertz and a narrow-bandwidth channel having a cutoff frequency of 0.2 megahertz, this ratio is 22.5. Since the display time for one picture frame is one-thirtieth of a second, a minimum time of approximately three-fourths of a second is required for a complete picture.

The above-mentioned integration time is sometimes limited by the observer of the reproduced image. Where a camera having a sufficiently long exposure time is used to observe the image, the system simulates a high-resolution, slow-scan narrow-bandwidth transmission system. Thus, for the stationary-image transmission system described above, the camera exposure time may be set to three-fourths of a second to thereby observe (i.e., photograph) the entire image including all of its picture elements. Hence, the stationary image being transmitted can be changed every 0.75 seconds. Such a system is shown in block diagram form in FIG. 3. Object 31 represents the stationary image (e.g., slide projection, photograph, printed page, etc.) to be transmitted. An image scanner 32 translates the elemental areas of object 31 into corresponding electrical signals. Thus, object 31 and scanner 32 together constitute a video signal source such as source 10 in FIG. 1. As in the embodiment shown in FIG. 1, driven sampling-rate generator 12 is responsive to the scanning-line frequency (line rate) of scanner 32 to develop the desired control signal; the rest of narrow-bandwidth transmission system shown in FIG. 3 also operates in a manner similar to that of FIG. 1.

At the receiver, display device 33 is responsive to the reconstituted video signal for displaying a completely reconstituted replica of the stationary image. Display device 33 may take several forms including that of a television receiver having a cathode-ray tube display. A camera 34 with, in this example, a 0.75-second exposure time observes (i.e., photographs) the image displayed by display device 33 to thereby record a completely reconstituted stationary image. Thus, a series of stationary images may be transmitted at a rate of one image per 0.75 seconds.

Figure 3:
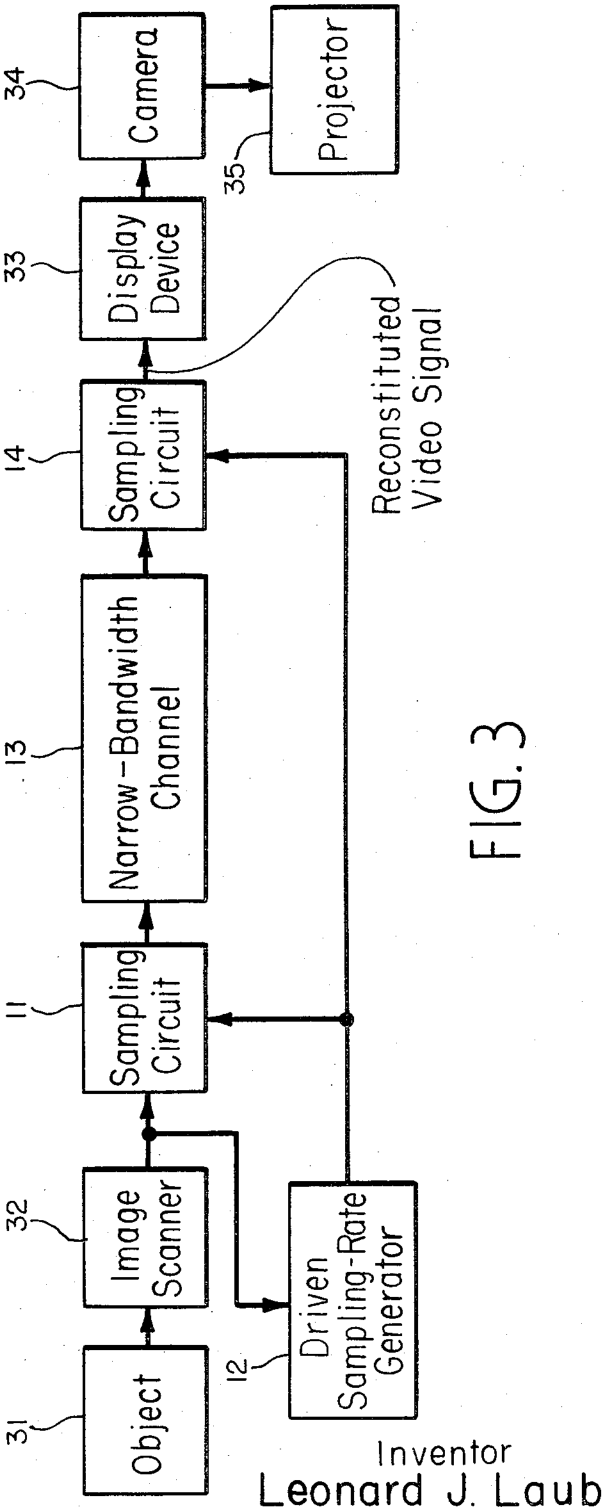
FIG. 3 is a block diagram of another preferred embodiment of the invention.

Quite obviously, object 31 also may be an individual frame of a non-stationary video signal including a sequential series of stationary image frames, such as a motion picture or video tape recording. Upon the completion of the scanning of each image, the frame is changed so that image scanner 32 sequentially translates the elemental areas of each image in the series into corresponding electrical signals. The bandwidth of the signal is reduced in accordance with the invention; thus, the system shown in FIG. 3 is also quite capable of transmitting a high-resolution motion picture or video television signal on a narrow-bandwidth basis. Of course, viewing a motion picture transmitted in this fashion would be quite annoying because of the slow motion and pronounced flicker. Nevertheless, the narrow-bandwidth transmission of a motion picture or video television signal, for example, on a frame-by-frame basis by this system to a receiver wherein the information is retrieved and stored on motion-picture film by camera 34 is quite feasible. A television receiver with a cathode-ray tube having its display sequentially photographed by a motion-picture camera having a film speed affording a 0.75-second exposure time per frame provides a suitable means for recording the reconstituted sequential series of stationary image frames. The film then may be subsequently played back at a faster rate by means of a motion-picture projector 35 (e.g., 22.5 times as fast to get 30 frames per second) to restore normal motion and eliminate flicker. Of course, a similar result obtains by substituting a video tape recorder (with playback and display provisions) for display device 33, camera 34, and projector 35.

The human eye, in contrast to a camera, integrates over a period of time equal to approximately one-fifteenth to one-tenth of a second. Since conventional television picture frames occur at a rate of 30 frames per second, two or three such frames are so integrated by the eye. Hence, although there isn't sufficient integration time to store all of the picture elements, the apparent resolution of the narrow-bandwidth transmission system, when observed directly by the eye, is enhanced two or three times.

Unfortunately, the shorter integration times give rise to moire patterns in the high-frequency regions of the video signal. Although the extreme high frequencies themselves are not reproducible, spurious moire patterns result from the beating or mixing of these high frequencies with the sampling frequency. With longer integration times, the beat frequencies run enough to effectively cancel so that the moire patterns are eliminated. Thus, when the display is observed by a camera having an exposure time of 0.75 seconds, the entire bandwidth of the original video signal may be utilized. For direct viewing of display device 33 by the human eye, however, the limited integration time of the eye requires removal of the unreproducible high-frequency components of the original video signal before the video signal is processed by the system of FIG. 1 in order to preclude the generation of these moire patterns. Removal of the high frequencies which cause the moire patterns may be accomplished by the embodiment of the invention described below in connection with FIG. 4.

Figure 4:
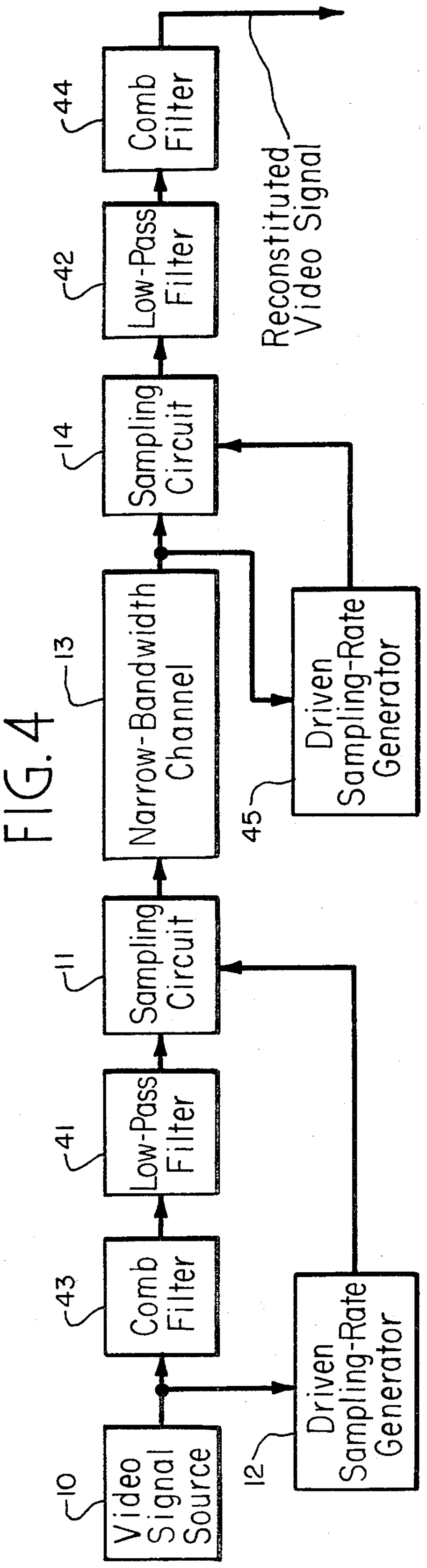
FIG. 4 is a block diagram of yet another preferred embodiment of the invention.

Although similar to the embodiment of the invention shown in FIG. 1, the embodiment shown in FIG. 4, in accordance with another aspect of the invention, incorporates a low-pass filter 41 between video signal source 10 and sampling circuit 11. Low-pass filter 41 removes the higher frequencies which, although not passed by narrow-bandwidth channel 13, are responsible for the creation of the spurious moire patterns described above. A suitable cutoff frequency for filter 41 is one several times greater than that of channel 13; for the example discussed above, this would be approximately 1 megahertz. Limiting the ultimate resolution by low-pass filter 41 makes it desirable to spread out the sampling pulses derived by the second sampler in order to improve picture brightness. This may be accomplished in various ways including lengthening the gate time of the second sampler or by placing a low-pass filter or a sample-and-hold circuit after the second sampler. Accordingly, in the embodiment shown in FIG. 4, a low-pass filter 42 is inserted after sampling circuit 14. Filter 42 preferably has a cutoff frequency equal to the frequency corresponding to the apparent horizontal resolution of the picture, which is the same frequency as the cutoff frequency of low-pass filter 41.

As thus far described, the narrow-bandwidth transmission system shown in FIG. 4 produces a rather satisfactory video display. By also incorporating a pair of comb filters, 43 and 44, an even more desirable display may be obtained from the system shown in FIG. 4. Before discussing the embodiment of FIG. 4 further, certain phenomena associated with the television scanning process should first be noted. As discussed above, the present United States television standards call for a 525-line, vertical interlaced scanning system; that is, the viewed object is scanned horizontally by the television camera 525 times with the scanner vertically progressing the width of two lines after the completion of each horizontal scanning line. After completion of the 263rd scanning line, the viewed object has been covered and the scanner re-scans the object and interlaces or fills in the gaps thus created with the remaining 262 lines. After the completion of the 525th scanning line, a picture frame is completed and the scanner then repeats this procedure to scan additional picture frames. It is known that high horizontal spatial frequencies in the viewed object produce correspondingly high electrical frequency components in the frequency spectrum of the video signal. High vertical spatial frequencies in the scanned object, on the other hand, produce electrical frequency components throughout the entire video frequency spectrum. In other words, if the viewed object were a black and white checkerboard, the abrupt changes in brightness encountered in scanning a horizontal row of squares would create high horizontal spatial frequencies which the television broadcasting equipment would convert into corresponding high-frequency electrical components in the video frequency spectrum, whereas the abrupt changes in brightness in the vertical direction would create high vertical spatial frequencies which would be converted into electrical frequency components throughout the entire frequency spectrum of the video signal. Thus, although the filtering of the video signal with a low-pass filter eliminates the spurious moire patterns due to unreproducible high horizontal spatial frequencies, it has no effect on the spurious moire patterns produced by the high vertical spatial frequencies. To remove the latter spurious moire patterns, it is necessary to filter out many narrow bands of signals throughout the video frequency spectrum. A further description of a typical video frequency spectrum is hereinafter presented with reference to FIG. 5.

Accordingly, the embodiment of the invention illustrated in FIG. 4, in accordance with a further aspect of the invention, includes a pair of comb filters 43 and 44 as shown. By providing comb filter 43, selective filtering of the above-described narrow bands of signals throughout the video frequency spectrum is obtained before the video signal is processed by sampling circuit 11. Hence, the video frequency components attributable to high vertical spatial frequencies are eliminated to thereby preclude the generation of spurious moire patterns resulting therefrom. This comb-filtering may, for example, be accomplished with a delay line and a less-than-unity positive feedback network, using a delay time equal to the time of one horizontal scan line (approximately 63.5 microseconds). A corresponding pair of filters, 42 and 44, are provided at the receiving portion of the system; that is, the portion of the system that follows narrow-bandwidth channel 13. Filters 42 and 44 are essentially identical to filters 41 and 43, respectively, and they eliminate any spurious signals that may be introduced into the receiving portion of the system by sampling circuit 14, for example. Of course, filters 41 and 43, as well as 42 and 44, may be interchanged without adversely affecting the performance of the invention. In addition, the embodiment of this invention shown in FIG. 4 also illustrates how the separate transmission path, from generator 12 to sampling circuit 14, mat be eliminated, as discussed above with reference to FIG. 1. Specifically, a second driven sampling-gate generator 45, similar to generator 12, is employed as shown to respond to the narrow-bandwidth transmission signal and derive therefrom a control signal having a frequency which is not integrally related to the line rate. The line rate is the fundamental frequency of the original video signal and is of course passed by channel 13, therefore generators 12 and 45 may operate in identical fashion.

Figure 5:
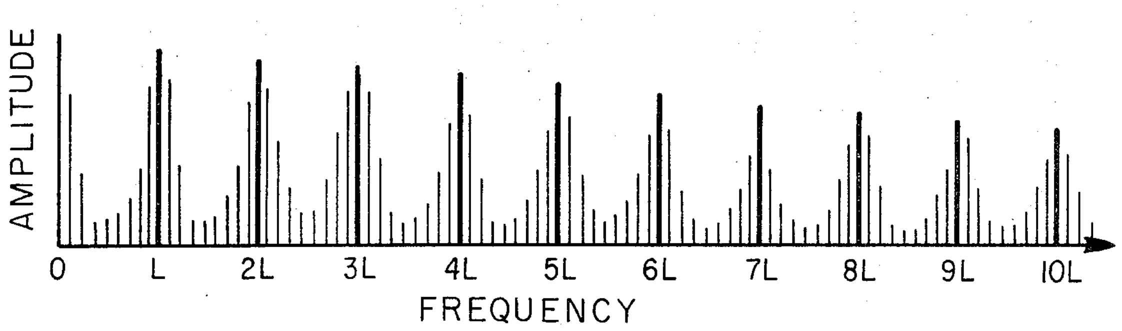
FIG. 5 is a graphical representation of the frequency spectrum of a typical video television signal.

With reference to FIG. 5, the frequency spectrum of a typical video television signal is shown graphically; for convenience, however, only that portion of the spectrum including the first ten harmonics of the line frequency L are illustrated. As is readily apparent, the frequency spectrum includes the fundamental or line frequency (L, 15,750 hertz) and a series of harmonics (2L, 3L, 4L, etc.), with the amplitudes thereof decreasing with higher orders and with each harmonic surrounded by sidebands at intervals of the field frequency (60 hertz). Sidebands intermediate the line frequency harmonics correspond to high vertical spatial frequencies in the scanned object; that is, object detail information which requires high vertical resolution in order to be reproduced. Quite obviously, the usefulness of such information is dependent upon the resolvability of the display device. In a narrow-bandwidth system of the type described herein, vertical resolution is sacrificed in favor of increased horizontal resolution. Consequently, the frequency information in the original video signal corresponding to high vertical detail, which is responsible for the spurious moire patterns explained above and which is also unusable in this system, may be filtered out. As discussed above, one particularly effective way of accomplishing this is to employ a comb filter; the result of such narrowing is graphically represented by FIG. 6. The comb filter passband, represented by the broken line, encloses that amount of the video spectrum which is desired for use at the receiving portion of the system. Depending on specific design objectives, of course, the amount so passed may be varied. In accordance with the principles of the invention, not only does such filtering preclude spurious moire patterns and eliminate unusable vertical information, it also provides gaps 60 in the video frequency spectrum into which other desired information may be inserted as described below.

Figure 6:
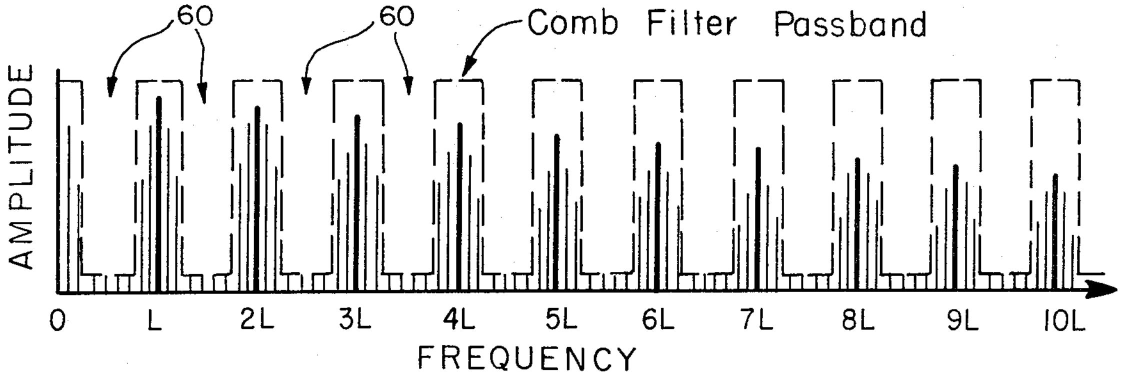
FIG. 6 is a graphical representation of the frequency spectrum produced by a preferred embodiment of the invention.

As an illustrative example of how such insertion is achieved, consider a system constructed in accordance with the embodiment of the invention as shown in FIG. 4 and having a sampling rate of 28.8 (29 minus 1/5) times the line rate. Accordingly, upon sampling, the system utilizes the conventional 525-line raster in groups of five lines; that is, there is a five-to-one tradeoff between vertical and horizontal resolution so that a 144 × 105 picture element format, instead of 29 × 525, is effected. Before the video signal is sampled, however, it is passed through comb filer 43 and low-pass filter 41. Adjusting the comb filter so that the width of each passband is one-fifth of the line frequency and low-pass filtering the comb-filtered signal at about 2.5 times the sampling frequency results in a signal from which an acceptable limited-resolution television picture free from spurious moire patterns may be produced. As generally indicated by FIG. 6, this signal has a frequency spectrum which is only partially (one-fifth for this particular example) utilized and which needs a rather large overall passband for its transmission. By sampling this signal, in accordance with the invention, with a sampling circuit having a non-integral sampling rate, which in this example is one-fifth less than an integral multiple of the line rate, the remaining information in the entire frequency spectrum is compressed into a relatively very narrow frequency spectrum; to wit, a spectrum whose upper frequency limit is approximately one-half the sampling frequency, as represented by FIG. 7.

Figure 7:
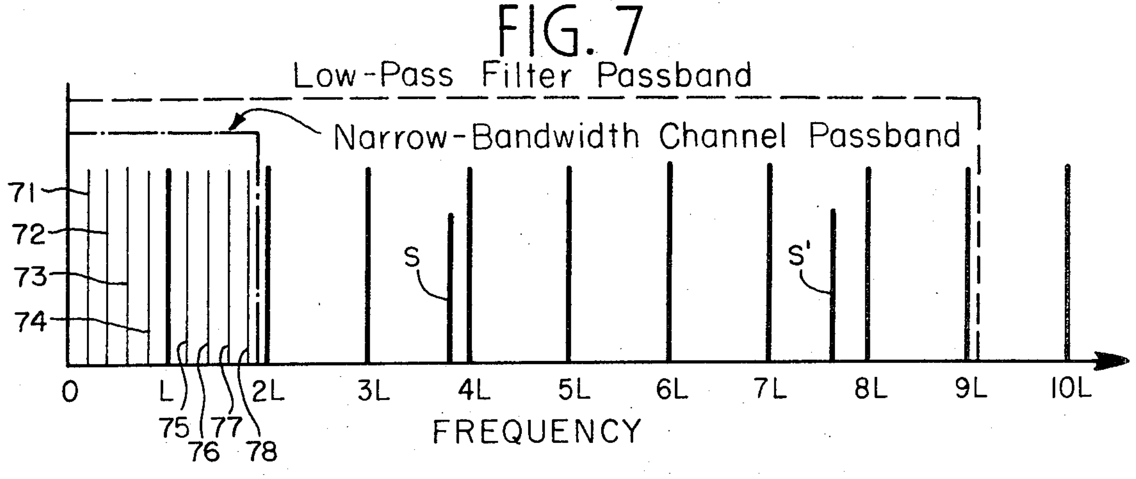
FIG. 7 is a graphical representation of another frequency spectrum produced by a preferred embodiment of the invention.

FIG. 7 is a graphical representation of the output signal of sampling circuit 11 for a system constructed in accordance with the embodiment of the invention depicted in FIG. 4. For ease of depiction, the sample rate chosen for this example is 3.8 (4 minus 1/5) times the line rate instead of the above 28.8 (29 minus 1/5); of course, channel 13 again has a cutoff frequency of one-half the sampling frequency and the low-pass filter has a cutoff frequency of 2.5 times the sampling frequency. At this point it should be recalled that the sampling by sampling circuits 11 and 14 is merely one form of impulse modulation. As is generally well known in this art, the mixing products of the impulse modulation of a signal of one frequency with a pulse carrier signal of another frequency (i.e., repetition rate) results in four signals having four different frequencies: the two original frequencies, the sum of the two frequencies, and the difference between the two frequencies; in addition, similar sets of products result from the mixing of the first signal with the harmonics of the pulse carrier signal. By noting only those products having frequencies below one-half the sampling frequency (i.e., those passed by the narrow-bandwidth channel), this system images or inserts all the information (within the passband of the low-pass filter, of course) of a frequency higher than the channel 13 cutoff frequency into the aforementioned gaps 60 to thereby compress all of the desired information into the relatively narrow passband of channel 13.

Considering FIG. 7 in greater detail, the ten relatively heavy vertical lines represent the video line rate, L, and its harmonics, 2L, 3L, 4L, etc. as indicated in the drawing and similar to FIGS. 5 and 6. Vertical line S represents the frequency of the sampling rate (which in this example is 3.8 times the line rate as stipulated in the above paragraph) and vertical line S' represents the second harmonic of the sampling rate (which is, of course, 7.6 times the line rate). The lines in FIG. 7 make no representation as to the amplitude of their respective frequencies; they merely represent the presence of such frequencies in the spectrum. The passband of narrow-bandwidth channel 13 is represented by the region enclosed by the indicated broken line; it is into this narrow region that the much larger frequency spectrum enclosed within the dotted line representing the passband of the low-pass filter is compressed. For maximum efficiency, the sampling frequency is selected to be twice the cutoff frequency of channel 13. In this example, therefore, the cutoff frequency of channel 13 is 1.9L. In many practical applications of the invention, of course, the cutoff frequency of channel 13 is invariable so the system is designed around it by making the sampling frequency essentially twice the upper cutoff frequency of channel 13. In addition, it is assumed that the comb filter is adjusted such that each narrow passband thereof is 0.2L wide and centered about its respective line frequency harmonic; that is, it encompasses only those signals less than $\pm 0.1$L away from the corresponding line frequency harmonic. For the sake of not unduly complicating the drawing, the comb-filter passband is not illustrated in FIG. 7. Lines 71 through 78 represent information which, in accordance with the sampling aspect of the invention, has been inserted into the above-mentioned gaps in the passband of channel 13. Line 71, for example, results from the mixing of sampling frequency S and harmonic frequency 4L (4L minus 3.8L equals 0.2L). Line 72 results from the mixing of harmonic S' and harmonic 8L (8L minus 7.6L equals 0.4L). Lines 73 through 78 result in a similar way. It is important to note that for each desired video signal component having a frequency within the low-pass filter passband, there is a unique impulse modulation mixing product having a frequency which falls within the narrow-bandwidth channel passband.

Once the compressed signal has been transmitted through channel 13, it is of course necessary to expand this signal to reconstitute a video signal representative of the original video signal. In accordance with another aspect of the invention, this is easily accomplished with the same means used to compress the signal, but in reverse order. Referring again to FIG. 4, a second sampling circuit 14 is provided at the receiving portion of the system to sample (i.e., impulse modulate) the compressed output signal of channel 13 with the same sampling rate as that of sampling circuit 11. Sometimes a small phase adjustment may be required to correct for slight phase errors introduced by the impulse response of narrow-bandwidth channel 13. Similar to the insertion process described above, sampling circuit 14 impulse modulates the signal transmitted by channel 13 with the sampling frequency to produce mixing products representative of the original video signal components. Unwanted mixing products are of course also produced, but by following sampling circuit 14 with low-pass filter 42 and comb filer 44, each filter having substantially the same passband as its transmitter counterpart, all such unwanted signals are eliminated leaving only the desired video frequency components. Thus, a reconstituted video signal is neatly constructed by the system for receiver display or whatever use desired.

It should be recalled that discussion hereinabove that narrow-bandwidth channel 13 may take several forms. It may, of course, includes a physical filter used to limit the overall bandwidth of the signal before transmission to a distant receiver in order to take advantage of the lower power requirements afforded by narrow-bandwidth transmission. Channel 13 may also include a physical filter used to limit the bandwidth of the signal so that several programs may be transmitted over the same fixed-bandwidth channel. On the other hand, narrow-bandwidth channel 13 may be a physical limitation of the transmission medium itself such as magnetic recording tape in a video tape recording system.

Where the narrow-bandwidth channel is the video recording tape itself, it is interesting to note that this narrow-bandwidth transmission system may be greatly simplified because the transmitter (i.e., recording and compression) circuitry is identical to the receiver (i.e., expansion and playback) circuitry. Consequently, the same physical components may be used for both processes; that is, by merely providing suitable switching means to connect the three elements in the proper order, the same elements may be used for recording the and playback. Quite obviously, this greatly reduces the cost of such a system and consequently renders it even more economically feasible for consumer product use.

It should be noted further that the above-described system is not necessarily limited to television signals but may obviously be utilized in any type of application where a periodic frequency spectrum is present. Moreover, where such a periodic frequency spectrum is not present, means such as a comb filter may be used to effectuate a periodic frequency spectrum. In general, for a given transmission channel passband having an upper cutoff frequency ($F_1$) through which it is desired to transmit a periodic frequency spectrum having a fundamental frequency ($F_2$) and an upper cutoff frequency ($F_3$), the preferable width ($\Delta$) of the narrow passbands of the comb filter is determined by the equation:

$$\Delta = (F_1/F_3)\,F_2$$

Given the above data, the preferred sampling rate ($F_s$) is determined by the equation:

$$F_s = nF_2 \pm \Delta$$

where $n$ is an integer. Since $F_s$ should preferably be twice the value of $F_1$, the preferred value for n is approximately equal to $2F_1/F_2$. In the television application described in detail hereinabove, $F_1$ is the upper cutoff frequency of narrow-bandwidth channel 13, $F_2$ is the television line rate (15.75 kilohertz), and $F_3$ is the upper cutoff frequency of low-pas filter 41 (4.5 megahertz). Accordingly, for a channel limited to 200 kilohertz, $\Delta$ is preferably approximately 3.17 kilohertz or one-fifth of the line rate. Hence, the sampling frequency ($F_s$), where $n$ is chosen to be 25, is 397.17 kilohertz or approximately twice $F_1$.

Thus, there has been described a new and improved narrow-bandwidth television system. The system provides a highly efficient utilization of a narrow-bandwidth channel to convey a maximum amount of usable information. Moreover, in a video tape recorder application, where the receiver and transmitter are in close proximity, the same components may be used for both bandwidth compression and expansion to thereby substantially reduce the cost and complexity of the system.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A television system for narrow-bandwidth transmission from a source to a receiver of a video signal having a plurality of picture lines per picture frame and said lines occurring at a pre-established line rate, comprising:

means, including a comb filter coupled to said source and having its narrow passbands respectively centered about said line rate and the harmonics thereof, for selectively filtering narrow bands of signals throughout the frequency spectrum of said video signal;

means, including a driven sampling-rate generator responsive to said video signal, for developing a control signal having a frequency equal to a non-integral factor times said line rate;

impulse modulation means, including a first sampling circuit, responsive to said control signal for producing a narrow-bandwidth transmission signal embodying a portion of said video signal;

means for transmitting said narrow-bandwidth transmission signal to said receiver;

and receiver means, including a second sampling circuit having a sampling rate identical to said first sampling circuit, for deriving a reconstituted video signal from said transmission signal.

* * * * *